(12) United States Patent
Yamamoto

(10) Patent No.: US 12,728,467 B2
(45) Date of Patent: Sep. 8, 2026

(54) DRILL

(71) Applicant: OSG CORPORATION, Toyokawa (JP)

(72) Inventor: Takahiro Yamamoto, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 268 days.

(21) Appl. No.: 18/553,942

(22) PCT Filed: May 10, 2021

(86) PCT No.: PCT/JP2021/017616
§ 371 (c)(1),
(2) Date: Oct. 4, 2023

(87) PCT Pub. No.: WO2022/239046
PCT Pub. Date: Nov. 17, 2022

(65) Prior Publication Data

US 2024/0367239 A1 Nov. 7, 2024

(51) Int. Cl.
*B23B 51/06* (2006.01)

(52) U.S. Cl.
CPC ...... *B23B 51/0686* (2022.01); *B23B 2250/12* (2013.01); *B23B 2251/182* (2022.01)

(58) Field of Classification Search
CPC ... B23B 51/0686; B23B 51/068; B23B 51/06; B23B 2250/12
See application file for complete search history.

(56) References Cited

U.S. PATENT DOCUMENTS

2012/0082524 A1 4/2012 Matsuda et al.
2015/0321267 A1 11/2015 Takai
(Continued)

FOREIGN PATENT DOCUMENTS

EP 2952278 B1 3/2020
JP 2016-064477 A 4/2016
JP 2016-514625 A 5/2016
(Continued)

OTHER PUBLICATIONS

English translation of WO 2014118881 (Year: 2014).*
(Continued)

*Primary Examiner* — Alan Snyder
(74) *Attorney, Agent, or Firm* — Muncy, Geissler, Olds & Lowe, P.C.

(57) ABSTRACT

A drill is provided with a flank at a leading end portion of a body. An oil hole is provided at the flank, having a fan-shaped cross-section. The fan-shaped cross-section is formed by being surrounded by a front-side inner wall surface, a rear-side inner wall surface, an outer peripheral-side inner wall surface, and an inner peripheral-side inner wall surface. Compared to a round hole, a discharge performance of cutting fluid of the oil hole is high. The rear-side inner wall surface curves in a circular arc shape toward the front in a rotation direction. Thus, the drill can secure a distance between a ridge section of the flank and the rear-side inner wall surface to be wide, can suppress stress acting on a section between the ridge section of the flank and the oil hole, and can thus increase a discharge amount of the cutting fluid and also secure a tool rigidity.

2 Claims, 16 Drawing Sheets

(56) References Cited

U.S. PATENT DOCUMENTS

2016/0059323 A1 3/2016 Riester
2019/0143423 A1 5/2019 Nakata et al.

FOREIGN PATENT DOCUMENTS

| | | | | |
|---|---|---|---|---|
| JP | 5926877 B2 | 5/2016 | | |
| WO | 2010146839 A1 | 12/2010 | | |
| WO | WO-2014118881 A1 * | 8/2014 | ............. | B23B 51/06 |
| WO | 2017199667 A1 | 11/2017 | | |
| WO | WO-2021024848 A1 * | 2/2021 | ............. | B23B 51/06 |
| WO | 2021038841 A1 | 3/2021 | | |

OTHER PUBLICATIONS

English translation of WO 2021024848 (Year: 2021).*
English translation of International Search Report of International Application No. PCT/JP2021/017616 mailed Jul. 6, 2021.
International Preliminary Report on Patentability of International Application No. PCT/JP2021/017616 drafted Dec. 28, 2021 and English translation thereof.
The extended European search report of the corresponding EP application No. 21940000.9 mailed Feb. 7, 2025.
Office Action of the corresponding IN application No. 202317063665 mailed Jul. 1, 2026.

* cited by examiner

FIG. 5

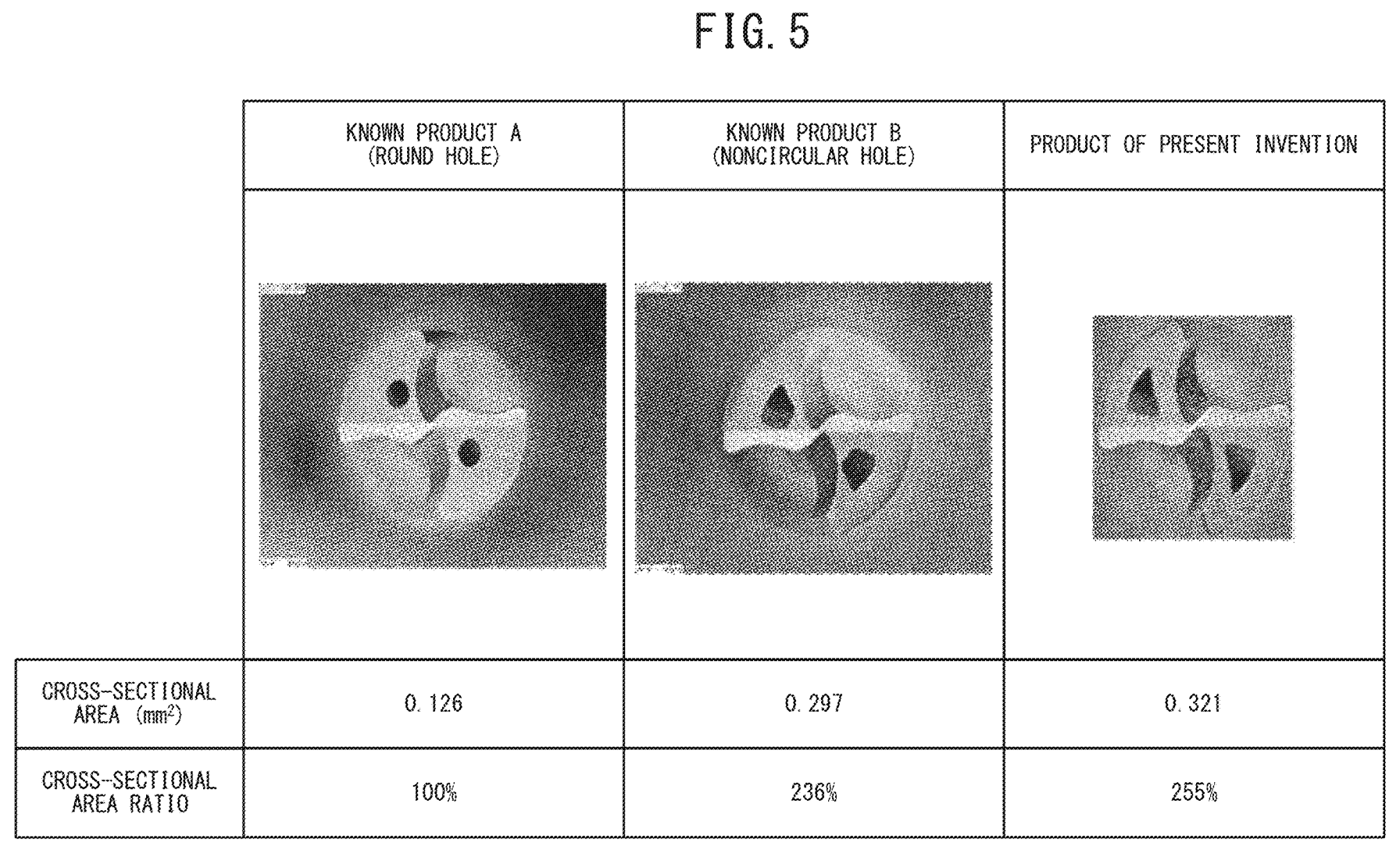

| | KNOWN PRODUCT A (ROUND HOLE) | KNOWN PRODUCT B (NONCIRCULAR HOLE) | PRODUCT OF PRESENT INVENTION |
|---|---|---|---|
| | | | |
| CROSS-SECTIONAL AREA ($mm^2$) | 0.126 | 0.297 | 0.321 |
| CROSS-SECTIONAL AREA RATIO | 100% | 236% | 255% |

FIG. 6

| | φ3 | | φ4 | | φ5 | | φ6 | | φ8 | |
|---|---|---|---|---|---|---|---|---|---|---|
| | CROSS-SECTIONAL AREA | RATIO | CROSS-SECTIONAL AREA | RATIO | CROSS-SECTIONAL AREA | RATIO | CROSS-SECTIONAL AREA | RATIO | CROSS-SECTIONAL AREA | RATIO |
| KNOWN PRODUCT A (ROUND HOLE) | 0.126 | 100% | 0.126 | 100% | 0.385 | 100% | 0.385 | 100% | 0.785 | 100% |
| KNOWN PRODUCT B (NONCIRCULAR HOLE) | 0.15 | 119% | 0.297 | 236% | 0.489 | 127% | 0.89 | 231% | 1.575 | 201% |
| PRODUCT OF PRESENT INVENTION | 0.183 | 145% | 0.32 | 254% | 0.504 | 131% | 0.731 | 190% | 1.293 | 165% |

| | φ10 | | φ12 | | φ16 | | φ20 | |
|---|---|---|---|---|---|---|---|---|
| | CROSS-SECTIONAL AREA | RATIO | CROSS-SECTIONAL AREA | RATIO | CROSS-SECTIONAL AREA | RATIO | CROSS-SECTIONAL AREA | RATIO |
| KNOWN PRODUCT A (ROUND HOLE) | 1.539 | 100% | 1.539 | 100% | 2.405 | 100% | 3.142 | 100% |
| KNOWN PRODUCT A (ROUND HOLE) | 2.462 | 160% | 3.546 | 230% | 6.313 | 262% | 9.079 | 289% |
| PRODUCT OF PRESENT INVENTION | 2.021 | 131% | 2.912 | 189% | 5.184 | 216% | 7.316 | 233% |

FIG. 7

| | RADIUS OF CURVATURE OF REAR-SIDE WALL SURFACE | | | | | | | |
|---|---|---|---|---|---|---|---|---|
| | 0.20D | 0.25D | 0.30D | 0.35D | 0.40D | 0.45D | 0.50D | 0.55D |
| CUTTING FLUID DISCHARGE AMOUNT | × | × | △ | ○ | ○ | ○ | ○ | ○ |
| DISTANCE WITH GASH PORTION (mm) | ○ | ○ | ○ | ○ | ○ | ○ | △ | × |
| CUTTING PERFORMANCE STABILITY | × | △ | ○ | ○ | ○ | ○ | △ | × |

DRILL

TECHNICAL FIELD

The present invention relates to a drill.

BACKGROUND ART

Of shapes of oil holes used for a drill, there are round holes and noncircular holes. With the round hole, there is often a case of not being able to sufficiently deploy a tool performance in a processing environment where a discharge amount of a cutting oil cannot be achieved, or a higher efficiency processing environment. With the noncircular hole, by improving a flow rate and discharge amount compared to the round hole, improvements are achieved in a lubricating performance and a cooling performance.

A cutting oil supply hole of a drill disclosed in Patent Literature 1 has a fan-shaped cross section. The fan-shaped cross section is formed to be surrounded by a forward-side inner wall surface, a rearward-side inner wall surface, an outer-circumference-side inner wall surface, and an inner-circumference-side inner wall surface. The rearward-side inner wall surface is positioned along a radial direction on the forward side in a rotation direction of the drill. The forward-side inner wall surface is positioned along the radial direction on the rearward side in the rotation direction of the drill and faces the forward-side inner wall surface in a circumferential direction. The outer-circumference-side inner wall surface is formed of a partial circular cylindrical surface centered on a center line of the drill. The inner-circumference-side inner wall surface is formed of a partial circular cylindrical surface having a radius of curvature smaller than that of the outer-circumference-side wall surface and centered on the center line of the drill, and faces the outer-circumference-side wall surface in the radial direction. With the above-described drill, significant performance improvements are obtained with respect to viscous work materials, such as SUS, Ti alloys, and the like, and to work materials having low thermal conductivity.

A drill having a gash portion with a circular arc shaped R portion is also known. A drill with a gash can cut even relatively hard work materials. A first ridge line between the R portion and a flank extends from an end on the inner side, in the radial direction, of the thinning edge toward the outside, in the radial direction, while curving toward the rotation direction.

CITATION LIST

Patent Literature

Patent Literature 1: Japanese Patent No. 5926877

Summary of Invention

When the cutting oil supply hole disclosed in Patent Literature 1 is applied to the drill having the gash portion, as a result of the cutting oil supply hole being in the vicinity of the R portion, there is a possibility that stress concentration may occur at a section at which a distance between the R portion and the cutting oil supply hole is short. Thus, when using a drill of a relatively thick size where the cutting resistance becomes large, or in high-feed processing, there is a possibility that a tool performance may become unstable due to insufficient tool rigidity.

An object of the present invention is to provide a drill capable of increasing a discharge amount of a cutting oil, while also securing tool rigidity.

Problems that Invention is to Solve

A drill according to a first aspect of the present invention includes: a bar-shaped tool main body to be rotated around a shaft center: a discharge flute provided in a helical shape in an outer peripheral surface of the tool main body from a leading end portion toward a rear end portion thereof: a cutting edge formed at a ridge section between an inner face, of the discharge flute, oriented toward the front in a rotation direction of the tool main body and a flank at the leading end portion: and an oil hole provided at the flank, the oil hole supplying a cutting oil to the side of the cutting edge. the oil hole is provided with a fan-shaped cross-section as a result of being surrounded by a front-side inner wall surface positioned along a radial direction to a front side in the rotation direction of the tool main body, a rear-side inner wall surface positioned along the radial direction to a rear side in the rotation direction of the tool main body, and facing the front-side inner wall surface in a circumferential direction, an outer peripheral-side inner wall surface formed by a partial cylindrical surface centered on a center line of the tool main body, and an inner peripheral-side inner wall surface formed by a partial cylindrical surface centered on the center line of the tool main body and having a smaller radius of curvature than the outer peripheral-side inner wall surface, and facing the outer peripheral-side inner wall surface in the radial direction. The rear-side inner wall surface curves in a circular arc shape toward the front in the rotation direction.

Since the present aspect is provided with oil hole having the fan-shaped cross section, a discharge amount of the cutting oil can be increased compared to a round hole. The rear-side inner wall surface of the oil hole is curved in the circular arc shape toward the front in the rotation direction, and thus, the present aspect can further secure a distance between the ridge section of the flank and the rear-side inner wall surface to be wide. Note that the ridge section of the flank is a ridge section between the inner surface, of the discharge flute, oriented toward the rear in the rotation direction of the tool main body, and the flank. In this way, since the present aspect can suppress stress acting on a portion between the ridge section and the oil hole, tool rigidity can be secured. Generally, when a cross-sectional area of the oil hole is increased, the tool rigidity deteriorates, but the drill of the present aspect can secure the tool rigidity and thus, the present aspect can also be used in high-feed processing. The high-feed processing is processing in which the tool is moved at high speed. The present aspect is also effective with a relatively large size where cutting resistance becomes large.

The drill according to the present aspect is provided with a gash portion, a ridge line between the gash portion and the flank extending in a circular arc shape from an inner end of the cutting edge toward an outer side in the radial direction, and connecting to the discharge flute. The rear-side inner wall surface may be curved in a circular arc shape to the same direction side as the gash portion, at a position separated from the gash portion. The present aspect is provided with the circular arc-shaped gash portion, but by causing the rear-side inner wall surface of the oil hole to curve in the circular arc shape to the same direction side as the gash portion, the distance to the ridge section of the flank can be secured to be uniformly wide.

In the drill according to the present aspect, in the cross-section, a radius of curvature of the rear-side inner wall surface may be equal to or greater than 0.35D and equal to or less than 0.45D. In this way, the drill can increase the discharge amount of the cutting oil, and can stabilize a cutting performance.

BRIEF DESCRIPTION OF THE DRAWINGS

FIG. 5 is a table comparing each of cross-sectional areas of a known product A, a known product B, and a product of the present invention.

FIG. 6 is a table comparing each of the cross-sectional areas of the known product A, the known product B, and the product of the present invention when a drill diameter is changed.

FIG. 7 is a table showing results of evaluation tests.

DESCRIPTION OF EMBODIMENTS

Figure 1:
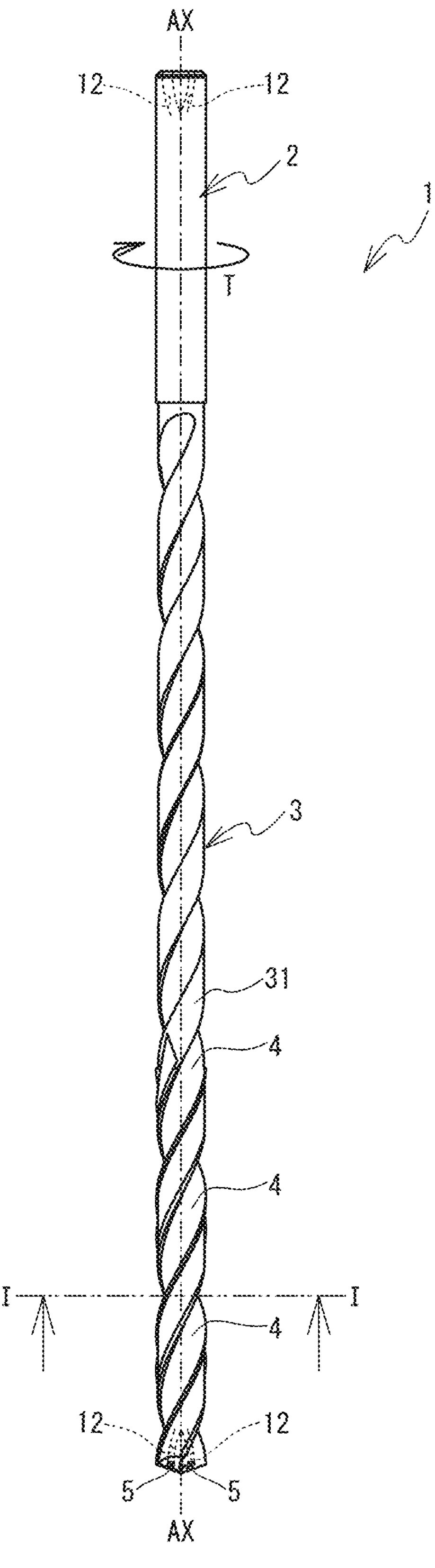
FIG. 1 is a side view of a drill 1.

An embodiment of the present invention will be described. The present invention is not limited to the following embodiment, and design changes can be made as appropriate. For descriptive clarity, there are locations in the drawings showing dimensional ratios that are different to actual dimensional ratios as necessary. The present invention is not interpreted as being limited to the shape thereof.

Figure 2:
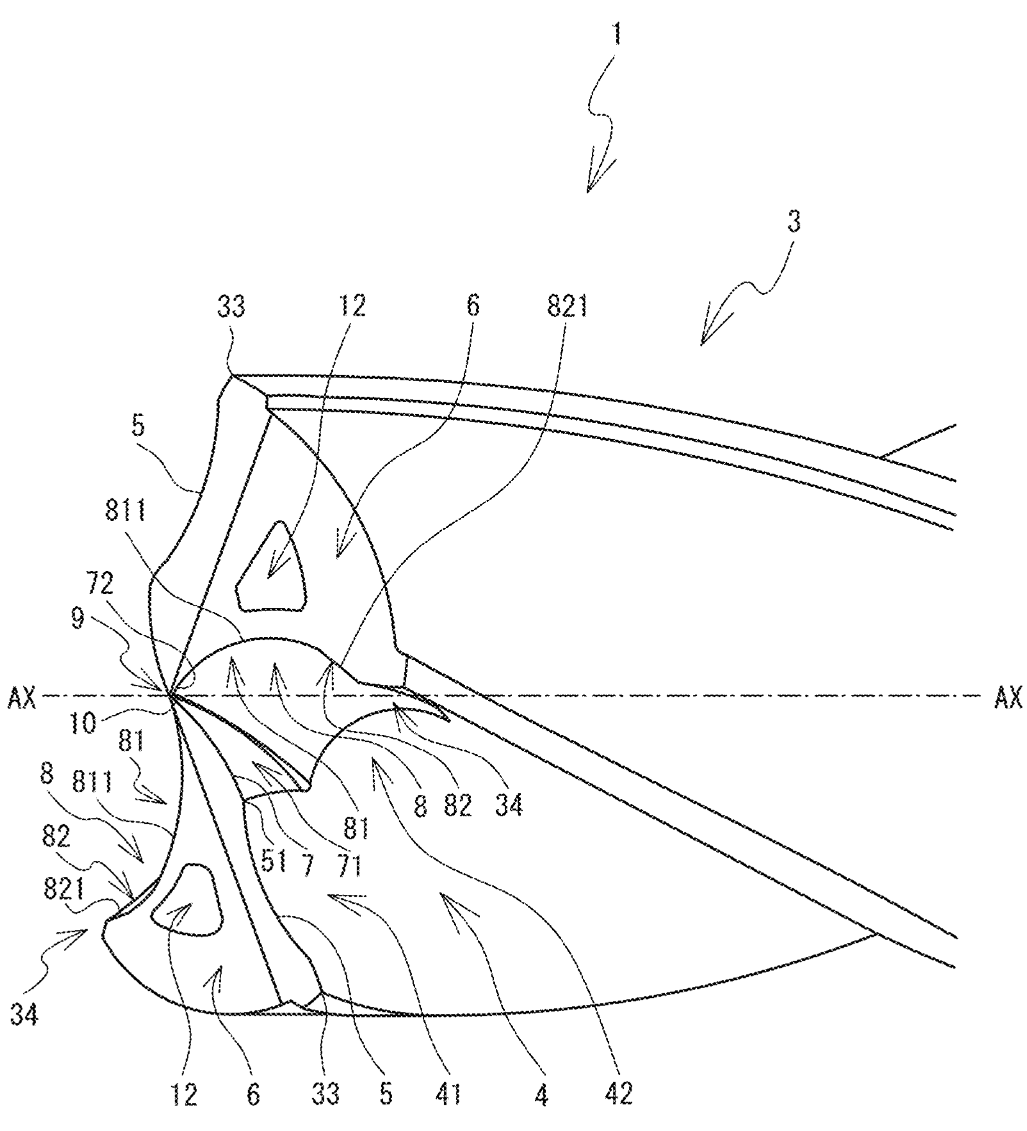
FIG. 2 is a perspective view of a leading end portion of the drill 1.
Figure 3:
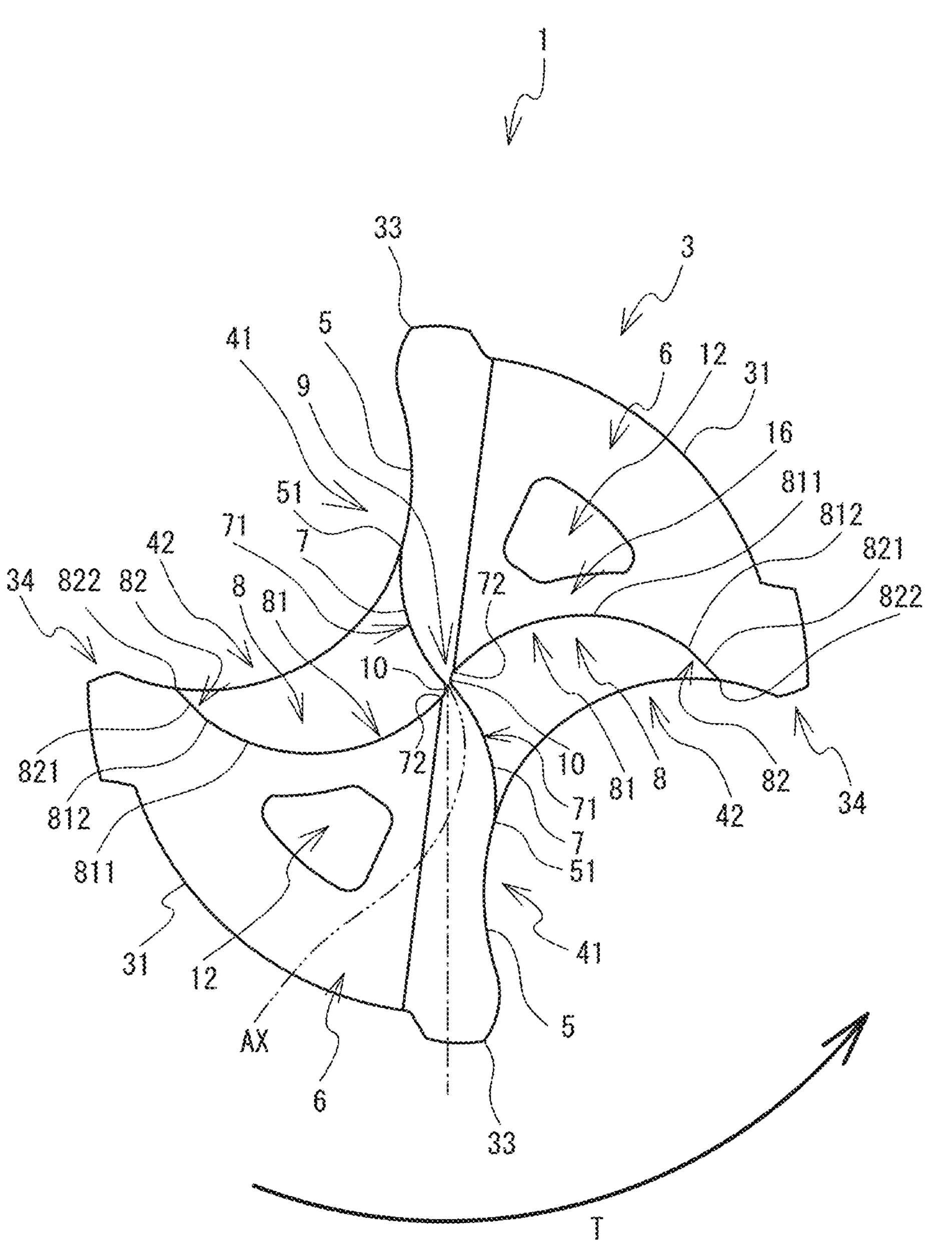
FIG. 3 is a front view of the drill 1.

The configuration of a drill 1 will be explained with reference to FIG. 1 to FIG. 3. The drill 1 is a two-edged long drill. The drill 1 is preferably formed from a hard material, such as a cemented carbide, high speed tool steel (high speed steel), or the like. The drill 1 is provided with a shank 2 and a body 3. The shank 2 and the body 3 are an example of a "tool main body" of the present invention. The shank 2 is mounted to a drive shaft of a machine tool (not shown in the drawings). The body 3 extends along a shaft center AX from the shank 2. The drill 1 cuts a work material by rotating around the shaft center AX, and forms a machining hole. At a time of machining, a rotation direction T of the drill 1 is a counterclockwise direction (refer to FIG. 3) as seen from a leading end portion side of the body 3 (hereinafter referred to as a "front view").

Two discharge flutes 4 are provided in an outer peripheral surface 31 of the body 3. The two discharge flutes 4 open at the leading end portion of the body 3. Each of the discharge flutes 4 is formed in a helical shape in the clockwise direction in a front view, from the leading end portion of the body 3 toward the rear end portion of the shank 2. At the time of machining, the discharge flute 4 discharges chips from the machining hole. As shown in FIG. 2 and FIG. 3, the discharge flute 4 is provided with an inner face 41 and an inner face 42. The inner face 41 is a face oriented toward the rotation direction T side. The inner face 42 is a face oriented to the opposite side from the rotation direction T. A ridge section at which the inner face 41 and the outer peripheral surface 31 intersect each other is a leading edge 33. A ridge section at which the inner face 42 and the outer peripheral surface 31 intersect each other is a heel portion 34.

Two flanks 6 are provided at the leading end portion of the body 3. The two flanks 6 are provided at mutually symmetrical positions centered on the shaft center AX. When the leading end portion of the body 3 is seen from the front, the two flanks 6 and the two discharge flutes 4 are alternately disposed in the circumferential direction. A cutting edge 5 is provided at a ridge section at which the inner face 41 and the flank 6 intersect each other. Two each of the inner faces 41 and the flanks 6 are provided at the leading end portion of the body 3, and thus, there are two of the cutting edges 5. The cutting edge 5 is formed in a substantially S shape in a front view, and cuts the work material. The inner face 41 in the vicinity of the cutting edge 5 is a rake face, and scoops up the chips cut by the cutting edge 5.

A chisel 9 is formed at the center of the leading end portion of the body 3. A thinning edge 7 is provided in the vicinity of the chisel 9. The thinning edge 7 curves in a circular arc shape to the side of the rotation direction T, from an inner end 51 of the cutting edge 5 toward the side of the chisel 9. The thinning edge 7 is provided at a ridge section between a thinning face 71 and the flank 6. The thinning edge 7 is provided with the thinning face 71. The thinning face 71 extends from the thinning edge 7 to the rear end portion side of the body 3, and is oriented toward the side of the rotation direction T. The thinning face 71 is a rake face.

A gash portion 8 is provided at the inner face 42 of the leading end portion of the body 3. At the time of machining, the gash portion 8 curls the chips scooped up by the rake faces, and also discharges the chips to the discharge flute 4. The gash portion 8 is provided with an R portion 81 and a straight portion 82. A ridge line between the R portion 81 and the flank 6 is a first ridge line 811. A ridge line between the straight portion 82 and the flank 6 is a second ridge line 821.

The first ridge line 811 extends from an inner end 72 of the thinning edge 7 toward an outer side in the radial direction, while curving in a circular arc shape toward the rotation direction T side. The R portion 81 extends from the first ridge line 811 to the rear end portion side of the body 3, and is formed in a curved surface shape that is curved toward the rotation direction T side. The curling of the chips cut by the thinning edge 7 is enhanced by the R portion 81.

The second ridge line 821 extends in a straight line from an outer end 812 of the first ridge line 811 toward the outer side in the radial direction. An outer end 822 of the second ridge line 821 connects to the discharge flute 4 further to the inner side in the radial direction than the outer peripheral surface 31. The straight portion 82 extends from the second ridge line 821 so as to separate from the shaft center AX the further toward the rear end portion side of the body 3, and is formed along the inner face 42. The straight portion 82 guides the chips that have been curled by the R portion 81 to the discharge flute 4. The discharge flute 4 causes the guided chips to flow to the rear end side of the body 3.

A circular arc groove 10 is provided at a section connecting an inner end of the R portion 81 and an inner end of the thinning face 71. The circular arc groove 10 extends from the chisel 9 toward the discharge flute 4, and curves in the circular arc shape toward the inner side in the radial direction. The circular arc groove 10 causes the chips scooped up by the thinning face 71 to flow smoothly to the gash portion 8.

Oil holes 12 are respectively provided at the two flanks 6, at the leading end portion of the body 3. The oil hole 12 extends in a helical shape, substantially in parallel to the discharge flute 4, from the rear end of the shank 2 toward the leading end portion of the body 3, and is open at the corresponding flank 6. The oil hole 12 supplies a cutting oil toward a portion of the work material that is being processed. Diamond-Like Carbo (DLC) is coated on the surface of the leading end portion of the body 3.

Figure 4:
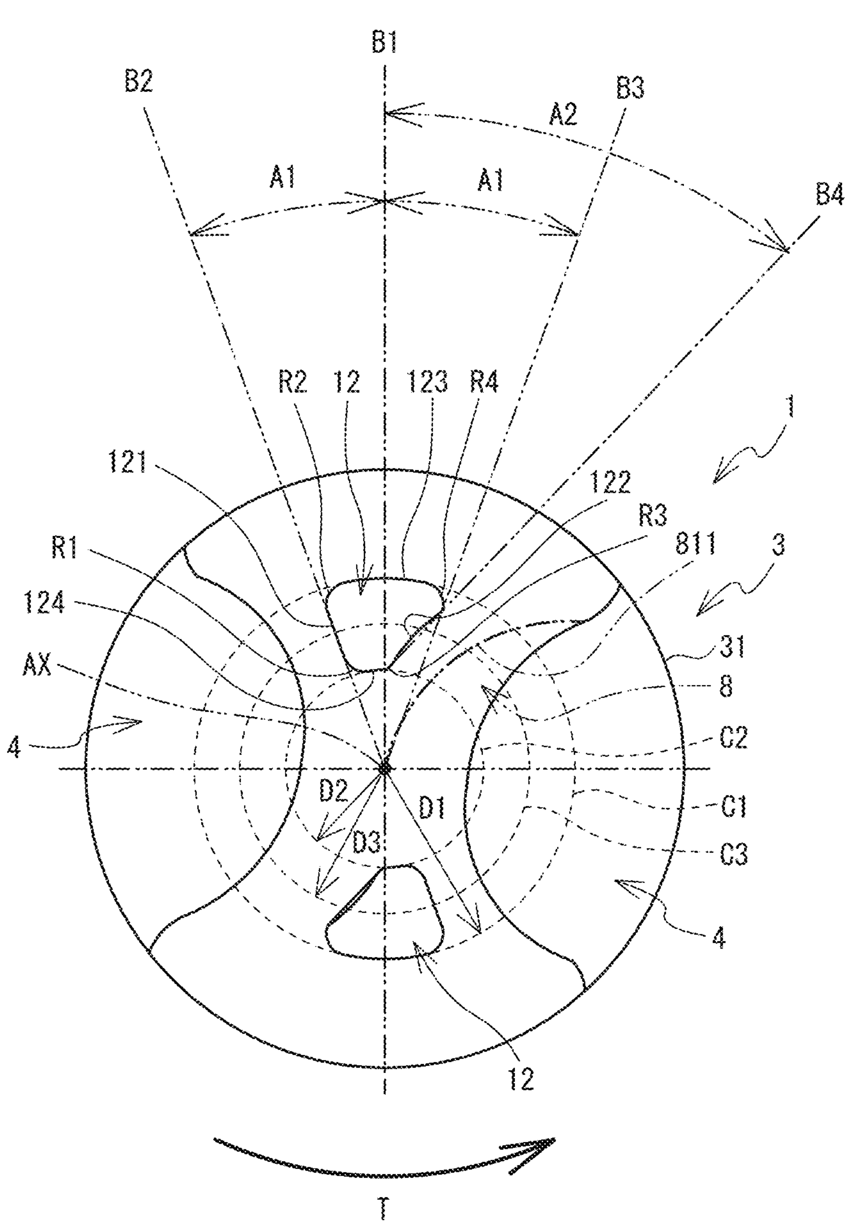
FIG. 4 is a cross-sectional view as seen in the direction of arrows along a line I-I shown in FIG. 1.

The shape of the oil hole 12 will be described with reference to FIG. 4. FIG. 4 is a cross-sectional view orthogonal to the shaft center AX of the drill 1, and virtually shows, using two-dot chain lines, the first ridge line 811 of the gash portion 8 in the vicinity of one of the oil holes 12. The oil hole 12 is a noncircular hole, and has a fan-shaped cross section. The fan-shaped cross section refers to the fact that the cross section of the oil hole 12 orthogonal to the shaft center AX has a substantial fan shape. The fan-shaped cross section of the oil hole 12 is provided with four corner portions R1 to R4, and is formed so as to be surrounded by a front-side inner wall surface 121, a rear-side inner wall surface 122, an outer peripheral-side inner wall surface 123, and an inner peripheral-side inner wall surface 124.

The front-side inner wall surface 121 is a flat surface positioned along the radial direction on the front side in the rotation direction T. The rear-side inner wall surface 122 is positioned along the radial direction on the rear side in the rotation direction T, and faces the front-side inner wall surface 121 in a peripheral direction. The rear-side inner wall surface 122 is curved in a circular arc shape in substantially the same direction as the direction in which the first ridge line 811 curves. The outer peripheral-side inner wall surface 123 is formed by a partial cylindrical surface having a radius of curvature D1 centered on the shaft center AX. The radius D1 corresponds to a radius of a circumscribed circle C1 of the oil hole 12. The inner peripheral-side inner wall surface 124 is formed from a partial cylindrical surface having a radius of curvature D2 centered on the shaft center AX, and faces the outer peripheral-side inner wall surface 123 in the radial direction. The radius of curvature D2 is smaller than the radius of curvature D1. The radius D2 corresponds to an inscribed circle C2 of the oil hole 12. The two oil holes 12 are aligned at an equal interval on a pitch circle C3 of a radius D3 centered on the shaft center AX, and are shaped to have point symmetry with the shaft center AX as a reference.

The corner portion R1 is a portion at which the front-side inner wall surface 121 and the inner peripheral-side inner wall surface 124 are connected to each other in a circular arc shape. The corner portion R2 is a portion at which the front-side inner wall surface 121 and the outer peripheral-side inner wall surface 123 are connected to each other in a circular arc shape. The corner portion R3 is a portion at which the rear-side inner wall surface 122 and the inner peripheral-side inner wall surface 124 are connected to each other in a circular arc shape. The corner portion R4 is a portion at which the rear-side inner wall surface 122 and the outer peripheral-side inner wall surface 123 are connected to each other in a circular arc shape.

At a center portion in the circumferential direction of the flank 6, a reference line extending from the shaft center AX to the outer side in the radial direction is B1. A reference line rotated around the shaft center AX by an angle A1 in the rotation direction T with respect to the reference line B1 is B2. A reference line rotated around the shaft center AX by an angle A1 in the opposite direction to the rotation direction T with respect to the reference line B1 is B3. Centered on an intersection point between the inscribed circle C2 and the reference line B1, a reference line rotated by an angle A2 in the opposite direction to the rotation direction T with respect to the reference line B1 is B4. The angle A2 is larger than the angle A1. The angle A2 is preferably decided such that the reference line B4 faces the first ridge line 811. The angle A1 is 20°, for example, and the angle A2 is 44°, for example.

The drill 1 is provided with the above-described oil holes 12 which have fan-shaped cross section, and can thus secure a web thickness in the vicinity of the chisel 9. Thus, the drill 1 can secure tool rigidity. Since the oil hole 12 is the noncircular hole, a cross-sectional area thereof can be made larger compared to a known round hole. As a result, the drill 1 can increase a discharge amount of the cutting oil compared to the round hole. For example, compared to a case of the known round hole of the same cross-sectional area, the closer to the outer periphery side of the oil hole 12, the longer the circumferential length, and a pressure based on centrifugal force becomes higher. Thus, the drill 1 can increase the speed of the cutting oil inside the oil hole 12 even when a supply pressure of the cutting oil is not made high, and can use the centrifugal force generated by the rotation of the drill 1 to increase the supply amount of the cutting oil.

The front-side inner wall surface 121 is disposed along the reference line B2. The rear-side inner wall surface 122 is disposed on the reference line B4, and curves in the circular arc shape to substantially the same side as the direction in which the first ridge line 811 curves. As shown in FIG. 3, at the leading end portion of the body 3, the rear-side inner wall surface 122 faces the first ridge line 811 via a mediating wall portion 16. The mediating wall portion 16 is a wall portion between the oil hole 12 and the first ridge line 811.

For example, in a known oil hole having a fan-shaped cross section for which the rear-side inner wall surface is a straight line, an apex of the first ridge line 811 comes close to the rear-side inner wall surface, and thus, at the time of machining, stress is concentrated. In contrast to this, in the oil hole 12 of the present embodiment, the rear-side inner wall surface 122 and the first ridge line 811 are curved lines that are substantially parallel to each other with the mediating wall portion 16 interposed therebetween. Thus, the drill 1 can effectively suppress stress from becoming concentrated in the mediating wall 16 at the time of machining. Further, as to be described below, in the drill 1 having a relatively large diameter of φ6 or more, compared to the known oil hole having the fan-shaped cross section, the cross-sectional area of the oil hole 12 can be made smaller. Thus, compared to the known oil hole having the fan-shaped cross section, the drill 1 can improve the tool rigidity, and can thus inhibit unexpected breakage caused by insufficient rigidity. Note that the radius of curvature of the rear-side inner wall surface 122 is preferably 0.35D or more and 0.45D or less.

Next, a comparison was made between the shape and cross-sectional area of the oil hole of the product of the present invention and a known product. As shown in FIG. 5, a known product A is a known drill provided with circular-shaped round holes. A known product B is a known drill provided with oil holes each having a fan-shaped cross section in which the rear-side inner wall surface is a straight line. The product of the present invention is the drill 1 provided with the oil hole 12 according to the present embodiment. A drill diameter D is φ3.2 for each of the drills. The cross-sectional area of the oil hole of the known product A was 0.126 $mm^2$, the cross-sectional area of the oil hole of the known product B was 0.297 $mm^2$, and the cross-sectional area of the oil hole of the product of the present invention was 0.321 $mm^2$. Assuming the cross-sectional area of the oil hole of the known product A to be 100%, the cross-sectional area of the oil hole of the known product B was 236%, and cross-sectional area of the oil hole of the product of the present invention was 255%. In this way, at φ3.2, it was understood that the product of the present invention is able to increase the cross-sectional area of the oil hole compared to the known product A and the known product B.

Next, a comparison was made for the cross-sectional area of the oil hole that changes in accordance with the drill diameter, for the product of the present invention and the known products. As shown in FIG. 6, the drill diameters of each of the known product A, the known product B, and the product of the present invention were changed and the cross-sectional areas of the oil holes were measured. The basic shapes of the known product A, the known product B, and the product of the present invention were the same as described above. The drill diameters that were compared are nine types, namely, φ3, φ4, φ5, φ6, φ8, φ10, φ12, φ16, and φ20.

For the known product A, the cross-sectional area of the oil hole at φ3 was 0.126 $mm^2$, the cross-sectional area of the oil hole at φ4 was 0.126 $mm^2$, the cross-sectional area of the oil hole at φ5 was 0.385 $mm^2$, the cross-sectional area of the oil hole at φ6 was 0.385 $mm^2$, the cross-sectional area of the oil hole at φ8 was 0.785 $mm^2$, the cross-sectional area of the oil hole at φ10 was 1.539 $mm^2$, the cross-sectional area of the oil hole at φ12 was 1.539 $mm^2$, the cross-sectional area of the oil hole at φ16 was 2.405 $mm^2$, and the cross-sectional area of the oil hole at φ20 was 3.142 $mm^2$.

For the known product B, the cross-sectional area of the oil hole at φ3 was 0.15 $mm^2$, the cross-sectional area of the oil hole at φ4 was 0.297 $mm^2$, the cross-sectional area of the oil hole at φ5 was 0.489 $mm^2$, the cross-sectional area of the oil hole at φ6 was 0.89 $mm^2$, the cross-sectional area of the oil hole at φ8 was 1.575 $mm^2$, the cross-sectional area of the oil hole at φ10 was 2.462 $mm^2$, the cross-sectional area of the oil hole at φ12 was 3.546 $mm^2$, the cross-sectional area of the oil hole at φ16 was 6.313 $mm^2$, and the cross-sectional area of the oil hole at φ20 was 9.079 $mm^2$.

When assuming the cross-sectional area of the known product A to be 100%, for the known product B, the cross-sectional area of the oil hole at φ3 was 119%, the cross-sectional area of the oil hole at φ4 was 236%, the cross-sectional area of the oil hole at φ5 was 127%, the cross-sectional area of the oil hole at φ6 was 231%, the cross-sectional area of the oil hole at φ8 was 201%, the cross-sectional area of the oil hole at φ10 was 160%, the cross-sectional area of the oil hole at φ12 was 230%, the cross-sectional area of the oil hole at φ16 was 262%, and the cross-sectional area of the oil hole at φ20 was 289%. From this, it was understood that the known product B can increase the cross-sectional area of the oil hole, regardless of the diameter φ of the drill, compared to the oil hole of the known product A.

For the product of the present invention, the cross-sectional area of the oil hole 12 at φ3 was 0.183 $mm^2$, the cross-sectional area of the oil hole 12 at φ4 was 0.32 $mm^2$, the cross-sectional area of the oil hole 12 at φ5 was 0.504 $mm^2$, the cross-sectional area of the oil hole 12 at φ6 was 0.731 $mm^2$, the cross-sectional area of the oil hole 12 at φ8 was 1.293 $mm^2$, the cross-sectional area of the oil hole 12 at φ10 was 2.021 $mm^2$, the cross-sectional area of the oil hole 12 at φ12 was 2.912 $mm^2$, the cross-sectional area of the oil hole 12 at φ16 was 5.184 $mm^2$, and the cross-sectional area of the oil hole 12 at φ20 was 7.316 $mm^2$.

When assuming the cross-sectional area of the known product A to be 100%, for the product of the present invention, the cross-sectional area of the oil hole 12 at φ3 was 145%, the cross-sectional area of the oil hole 12 at φ4 was 254%, the cross-sectional area of the oil hole 12 at φ5 was 131%, the cross-sectional area of the oil hole 12 at φ6 was 190%, the cross-sectional area of the oil hole 12 at φ8 was 165%, the cross-sectional area of the oil hole 12 at φ10 was 131%, the cross-sectional area of the oil hole 12 at 12 was 189%, the cross-sectional area of the oil hole 12 at φ16 was 216%, and the cross-sectional area of the oil hole 12 at φ20 was 233%.

From this, it was understood that the product of the present invention can increase the cross-sectional area of the oil hole 12, regardless of the diameter of the drill, compared to the oil hole of the known product A. Further, in terms of a relationship with the known product B, in the drills with the relatively small diameters of φ3 to 5, it was understood that the cross-sectional area can be increased compared to the known product B. Thus, in the product of the present invention with the relatively small diameters of φ3 to 5, it was understood that the discharge amount of the cutting oil can be increased compared to the known product B.

On the other hand, for the drills of the relatively large diameters of φ6 to 20, since an inertial force at the time of rotation is large compared to the small diameter drills, the tool rigidity is necessary. In the drills of φ6 to 20, the cross-sectional area of the oil hole of the product of the present invention is larger than the cross-sectional area of the oil hole of the known product A, but is smaller than the cross-sectional area of the oil hole of the known product B. Thus, in the product of the present invention of the relatively large diameters of φ6 to 20, it was understood that the discharge amount of the cutting oil can be increased compared to the known product A, and the tool rigidity can be improved compared to the known product B.

Evaluation tests of a radius of curvature of the rear-side inner wall surface 122 will be described with reference to FIG. 7. In the present tests, eight types of the drill 1 were manufactured while changing the radius of curvature of the rear-side inner wall surface 122 of the oil hole 12, and three items, namely, the cutting oil discharge amount, a distance with the gash portion 8, and a cutting performance stability, were evaluated. The distance with the gash portion 8 is a width of the mediating wall portion 16 (a length in a direction orthogonal to a length direction).

Machining conditions will be described. The drill diameter was φ3. Carbon steel S50C was used as the work material. A cutting speed was 100 m/min. A feed amount was 0.18 mm/rev. A machining depth of the work material was set to 15 mm. A water-soluble cutting oil was used. A coolant pressure was 1 MPa.

Evaluation methods will be described. The cutting oil discharge amount was compared to the cutting oil discharge amount in the oil hole of the known product B and a smaller amount was evaluated as x, which indicates Poor result, a similar amount was evaluated as Δ, which indicates Marginal result, and a greater amount was evaluated as ○, which indicates Good result. The distance with the gash portion 8 was evaluated in a comprehensive manner, including position alignment accuracy of the oil hole 12 when processing the discharge flute 4, variations in a degree of symmetry of the two oil holes 12 when manufacturing the drill 1, and the like, and was evaluated using the three evaluation levels of ○ (Good), Δ (Marginal), x (Poor). For the cutting performance stability, the drill durability and stability when repeatedly machining holes in the work material under the above-described conditions were evaluated in a comprehensive manner, and were evaluated using the three evaluation levels of ○ (Good), Δ (Marginal), x (Poor).

Results will be described with reference to FIG. 7. For the drill with the radius of curvature=0.20D, the cutting oil discharge amount was Poor, the distance with the gash portion was Good, and the cutting performance stability was Poor. For the drill with the radius of curvature=0.25D, the cutting oil discharge amount was Poor, the distance with the gash portion was Good, and the cutting performance stability was Marginal. For the drill with the radius of curvature=0.30D, the cutting oil discharge amount was Marginal, the distance with the gash portion was Good, and the cutting performance stability was Good. For the drill with the radius of curvature=0.35D, the cutting oil discharge amount was Good, the distance with the gash portion was Good, and the cutting performance stability was Good. For the drill with the radius of curvature=0.40D, the cutting oil discharge amount was Good, the distance with the gash portion was Good, and the cutting performance stability was Good. For the drill with the radius of curvature=0.45D, the cutting oil discharge amount was Good, the distance with the gash portion was Good, and the cutting performance stability was Good. For the drill with the radius of curvature=0.50D, the cutting oil discharge amount was Good, the distance with the gash portion was Marginal, and the cutting performance stability was Marginal. For the drill with the radius of curvature=0.55D, the cutting oil discharge amount was Good, the distance with the gash portion was Poor, and the cutting performance stability was Poor.

From the above results, it was proved that the radius of curvature for which the cutting oil discharge amount, the distance with the gash portion, and the cutting performance stability were all Good were 0.35D, 0.40D, and 0.45D. Thus, it was proved that an optimal range of the radius of curvature of the rear-side inner wall surface 122 is 0.35D to 0.45D.

Durability comparative tests of the drill 1 will be described with reference to FIG. 8 to FIG. 12. The durability comparative tests were configured by durability tests 1 to 5. In the durability tests 1 to 5, a number of machining holes and a state of the tool were investigated when repeatedly machining holes in the work material while changing the machining conditions, using the three types of the product of the present invention, the known product A, and the known product B. The basic shapes of the known product A, the known product B, and the product of the present invention are the same as described above. The machining conditions of the durability tests 1 to 5 are as described below.

Durability Test 1
- Drill diameter D=φ8.5
- Work material=S50C
- Cutting speed=100 m/min
- Feed amount=0.255 mm/rev
- Hole depth=42.5 mm Durability Test 2
- Drill diameter D=φ6.8
- Work material=S50C
- Cutting speed=120 m/min
- Feed amount=0.27 mm/rev
- Hole depth=25 mm (penetrating through work material)

Durability Test 3
- Drill diameter D=φ6.8
- Work material=SCM440 (30HRC)
- Cutting speed=70 m/min
- Feed amount=0.27 mm/rev
- Hole depth=25 mm (penetrating through work material)

Durability Test 4
- Drill diameter D=φ6.8
- Work material=SUS304
- Cutting speed=80 m/min
- Feed amount=0.27 mm/rev
- Hole depth=25 mm (penetrating through work material)

Figure 8:
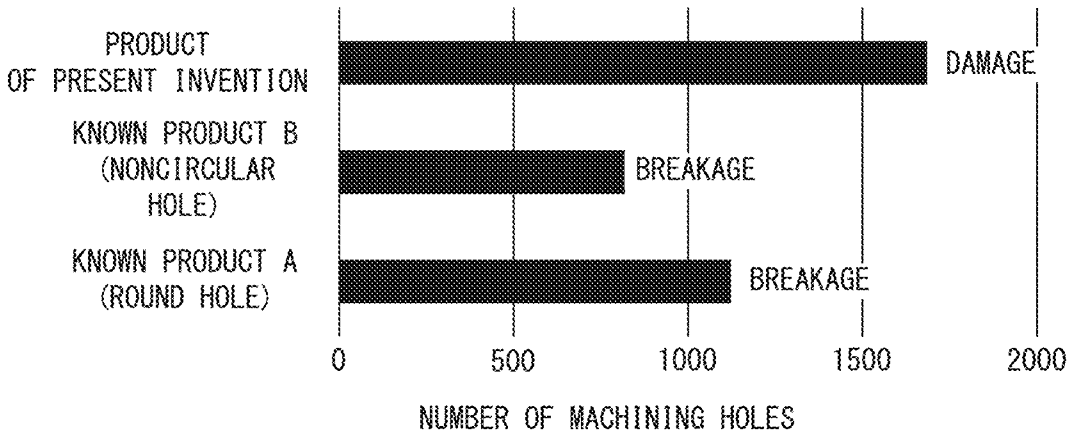
FIG. 8 is a graph showing results of a durability test 1.

Durability Test 5
- Drill diameter D=φ3.4
- Work material=51CrV4
- Cutting speed=64 m/min
- Feed amount=0.09 mm/rev
- Hole depth=17 mm Results of durability test 1 will be described with reference to FIG. 8. For the known product A, the drill broke when the number of machining holes was 1,122. For the known product B, the drill broke when the number of machining holes was 818. For the product of the present invention, the drill was partially damaged when the number of machining holes was 1,685, but the drill did not break. It is estimated that the reason the number of machining holes for the known product B was fewer than the number of machining holes for the known product A was that the cross-sectional area of the oil holes was larger and the tool rigidity deteriorated. The number of machining holes increased for the product of the present invention more than for both the known product A and the known product B. From the above results, it was understood that, in the machining conditions of durability test 1, the durability performance of the product of the present invention is improved compared to the known products A and B.

Figure 9:
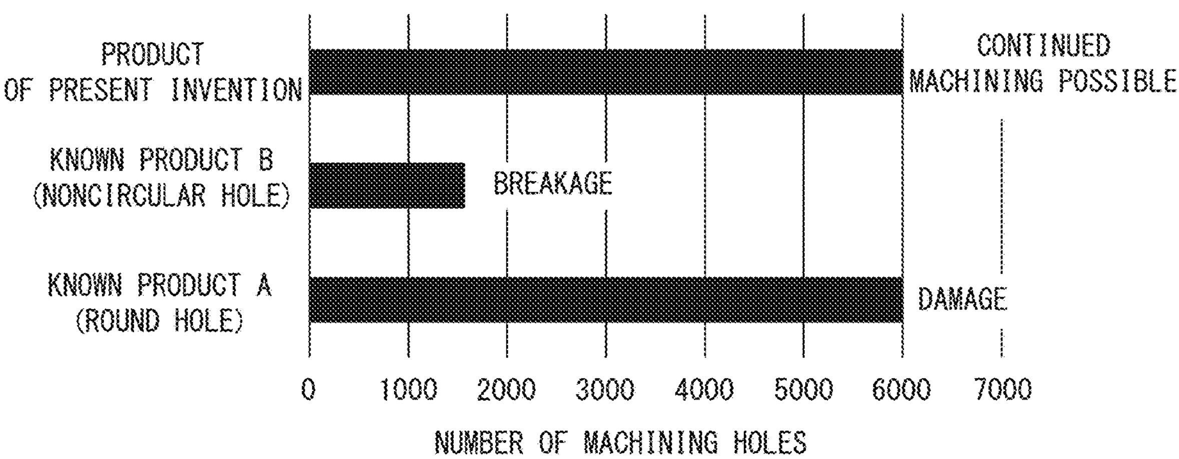
FIG. 9 is a graph showing results of a durability test 2.

Results of durability test 2 will be described with reference to FIG. 9. For the known product A, the drill was partially damaged when the number of machining holes was 6,000. For the known product B, the drill broke when the number of machining holes was 1,578. For the product of the present invention, the drill was partially damaged when the number of machining holes was 6,000 but it was possible to continue machining holes after that also. It is estimated that the reason for the number of machining holes for the known product B being even fewer than the number of machining holes for the known product A compared to durability test 1, was that the cutting speed and feed amount were faster than durability test 1, and the drill of the known product B could not withstand the stress when cutting. From the above results, it was understood that, in the machining conditions of durability test 2 also, the durability performance of the product of the present invention is improved compared to the known products A and B.

Figure 10:
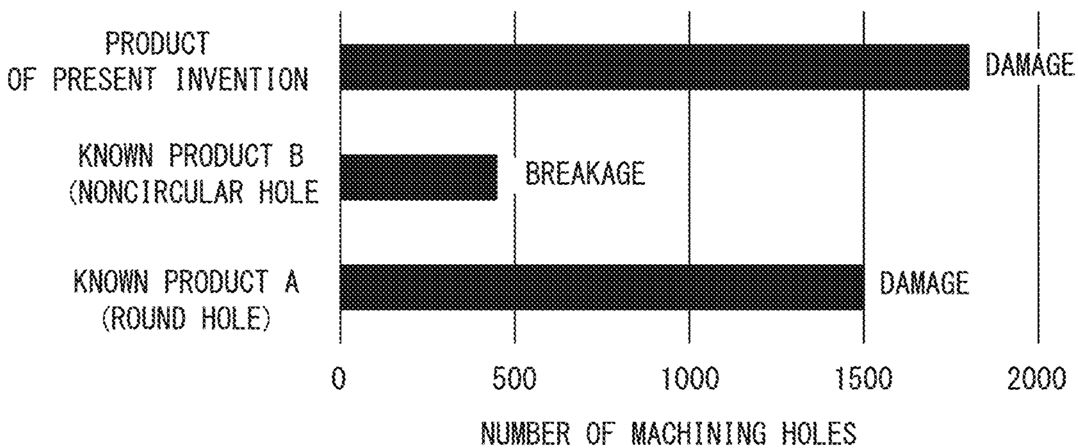
FIG. 10 is a graph showing results of a durability test 3.

Results of durability test 3 will be described with reference to FIG. 10. For the known product A, the drill was partially damaged when the number of machining holes was 1,500. For the known product B, the drill broke when the number of machining holes was 447. For the product of the present invention, the drill was partially damaged when the number of machining holes was 1,800. In durability test 3, the machining was performed when the work material was changed to SCM440, and, in a similar manner to durability tests 1 and 2, the number of machining holes for the product of the present invention was increased compared to the number of machining holes for the known products A and B.

From the above results, it was understood that, in the machining conditions of durability test 3 also, the durability performance of the product of the present invention is improved compared to the known products A and B.

Figure 11:
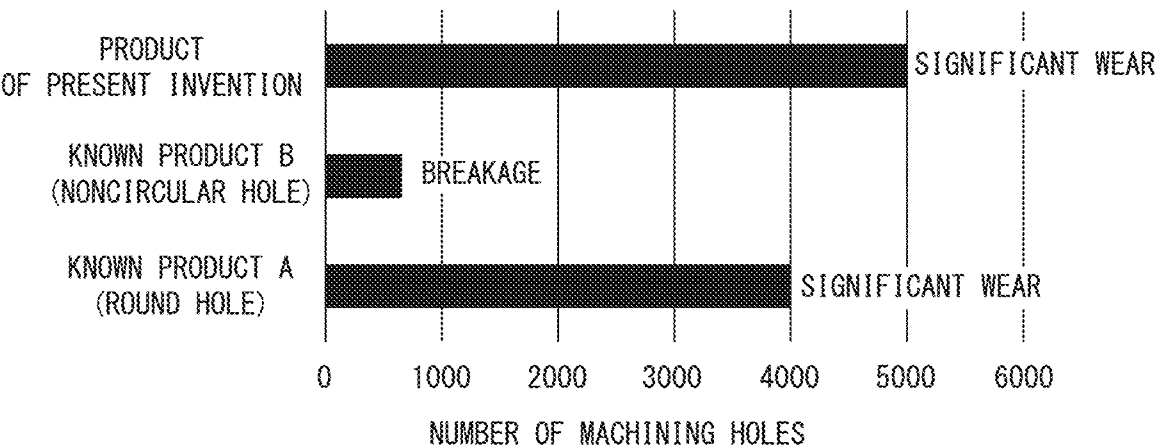
FIG. 11 is a graph showing results of a durability test 4.

Results of durability test 4 will be described with reference to FIG. 11. For the known product A, there was a significant amount of wear of the drill when the number of machining holes was 4,000. For the known product B, the drill broke when the number of machining holes was 658. For the product of the present invention, there was a significant amount of wear of the drill when the number of machining holes was 5,000. In durability test 4, the machining was performed when the work material was changed to SUS304, and, in a similar manner to durability tests 1 to 3, the number of machining holes for the product of the present invention was increased compared to the number of machining holes for the known products A and B. From the above results, it was understood that, in the machining conditions of durability test 4 also, the durability performance of the product of the present invention is improved compared to the known products A and B.

Figure 12:
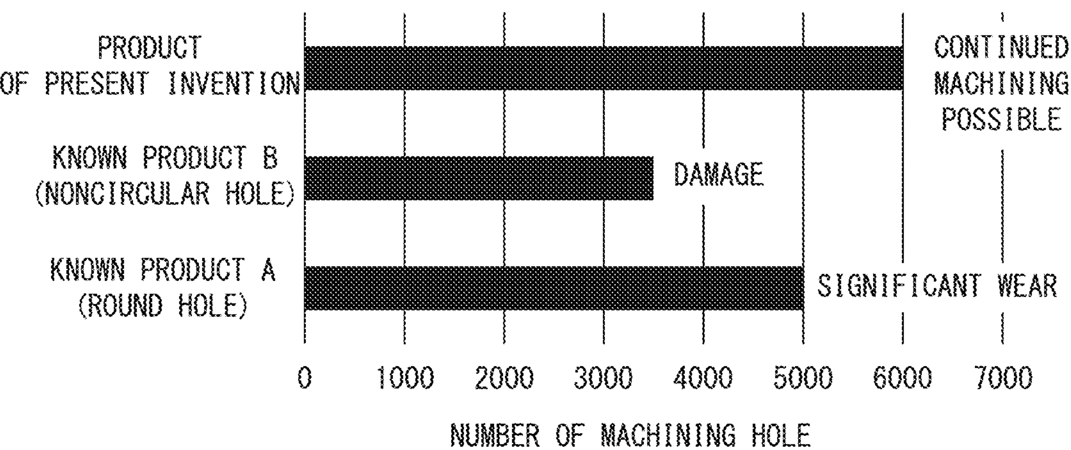
FIG. 12 is a graph showing results of a durability test 5.

Results of durability test 5 will be described with reference to FIG. 12. For the known product A, there was a significant amount of wear of the drill when the number of machining holes was 5,000. For the known product B, the drill was partially damaged when the number of machining holes was 3,500. For the product of the present invention, when the number of machining holes was 6,000 it was possible to continue machining holes after that also. In durability test 5, the machining was performed when the work material was changed to 51CrV4, and, in a similar manner to durability tests 1 to 3, the number of machining holes for the product of the present invention was increased compared to the number of machining holes for the known products A and B. From the above results, it was understood that, in the machining conditions of durability test 5 also, the durability performance of the product of the present invention is improved compared to the known products A and B.

Figure 13:
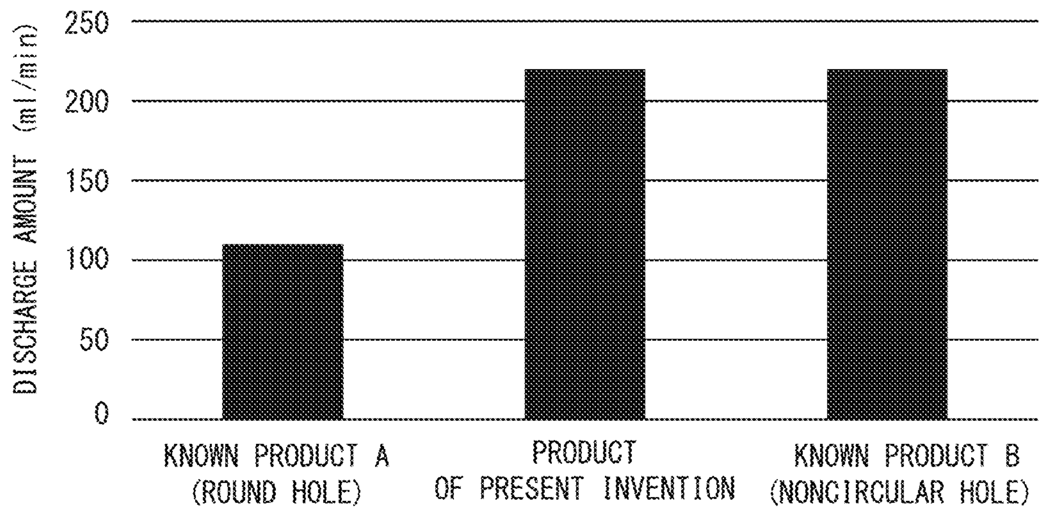
FIG. 13 is a graph showing results of a discharge amount test 1.
Figure 14:
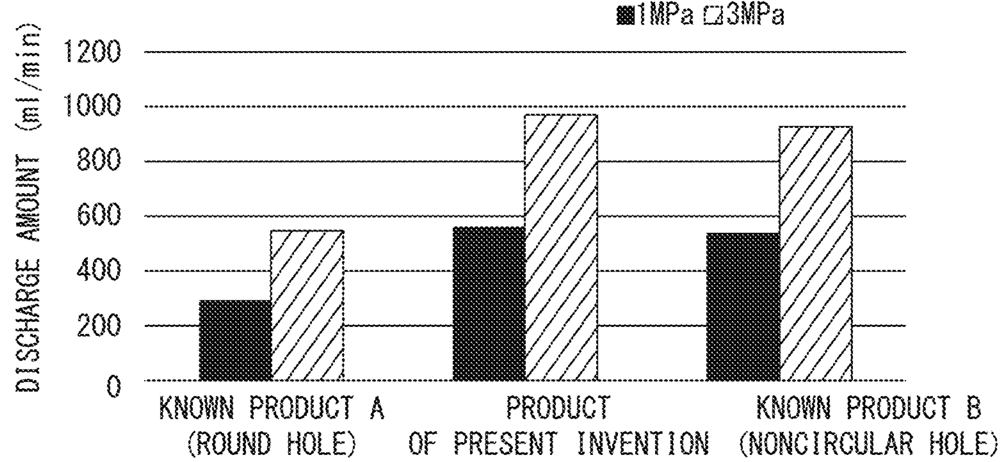
FIG. 14 is a graph showing results of a discharge amount test 2.
Figure 15:
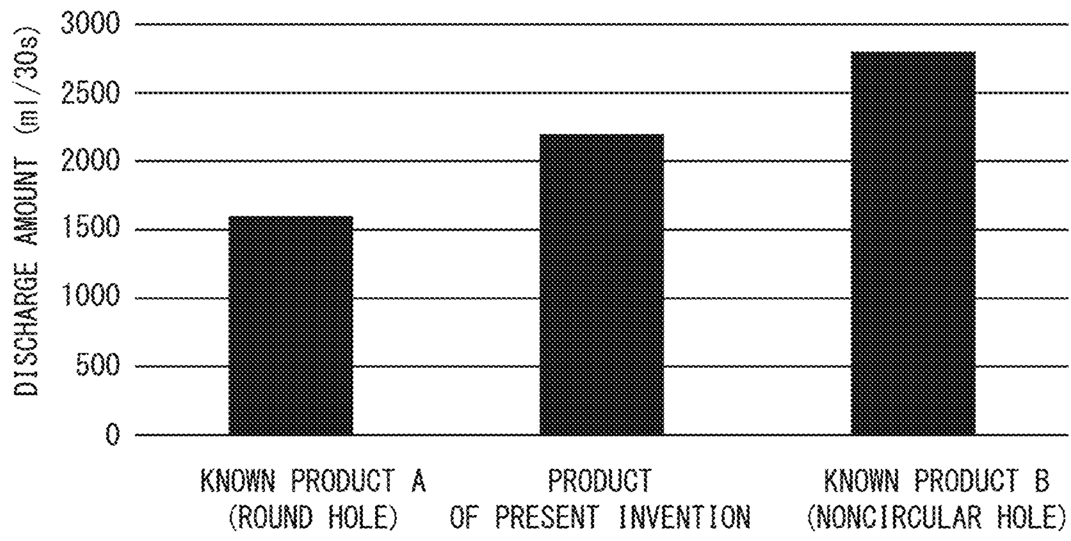
FIG. 15 is a graph showing results of a discharge amount test 3.

Discharge amount comparative tests of the drill 1 will be described with reference to FIG. 13 to FIG. 15. The discharge amount comparative test is configured by discharge amount tests 1 to 3. In discharge amount tests 1 to 3, the discharge amount of the cutting oil per unit time was investigated, for the three types of the product of the present invention, the known product A, and the known product B, while changing the type of the cutting oil, the drill diameter, and the coolant pressure. The basic shapes of the known product A, the known product B, and the product of the present invention are the same as described above. In discharge amount test 1, a water-insoluble cutting oil was used, the drill diameter was φ3.4, the coolant pressure was 1.5 MPa, and a measurement time period was one minute. In discharge amount test 2, a water-soluble cutting oil was used, the drill diameter was φ3.4, the coolant pressures were two patterns of 1 MPa and 3 MPa, and the measurement time period was one minute. In discharge amount test 3, a water-soluble cutting oil was used, the drill diameter was φ6.8, the coolant pressure was 1.5 MPa, and a measurement time period was thirty seconds. Note that in discharge amount tests 1 and 2, the oil hole of the known product A was φ0.4. In discharge amount test 3, the oil hole of the known product A was φ1.

Results of discharge amount test 1 will be described with reference to FIG. 13. The discharge amount for the known product A was 110 ml/min, the discharge amount for the known product B was 220 ml/min, and the discharge amount for the product of the present invention was 220 ml/min. From the above results, it was understood that when the water-insoluble cutting oil is used with the product of the present invention of the small diameter of φ3.4, the larger discharge amount than the known product A and the same discharge amount as the known product B can be secured.

Results of discharge amount test 2 will be described with reference to FIG. 14. When the coolant pressure=1 Pa, the discharge amount for the known product A was 295 ml/min, the discharge amount for the known product B was 540 ml/min, and the discharge amount for the product of the present invention was 562 ml/min. When the coolant pressure=3 Pa, the discharge amount for the known product A was 547 ml/min, the discharge amount for the known product B was 930 ml/min, and the discharge amount for the product of the present invention was 972 ml/min. From the above results, it was understood that when the water-soluble cutting oil is used with the product of the present invention of the small diameter of φ3.4, it is possible to increase the discharge amount compared to the known products A and B.

Results of discharge amount test 3 will be described with reference to FIG. 15. The discharge amount for the known product A was 1, 600 ml/30 s, the discharge amount for the known product B was 2,800 ml/30 s, and the discharge amount for the product of the present invention was 2,200 ml/30 s. From the above results, it was understood that when the water-soluble cutting oil is used with the product of the present invention of the large diameter of φ6.8, the discharge amount is smaller than that of the known product B, but can be increased compared to the known product A.

From the results of the above discharge amount tests 1 to 3, it was understood that the product of the present invention can increase the discharge amount of the cutting oil compared to at least the known product A, regardless of the water-insoluble or water-soluble cutting oil, and of the drill diameter. Further, in the relatively small diameter, it was understood that the discharge amount can be increased compared to the known product B.

As described above, the drill 1 of the present embodiment is provided with the body 3, the shank 2, the discharge flute 4, the cutting edge 5, and the oil hole 12. The body 3 and the shank 2 are rod shaped and are rotated around the shaft center AX. The discharge flute 4 is provided in the helical shape in the outer peripheral surface 31 extending from the leading end portion of the body 3 toward the rear end portion of the shank 2. The cutting edge 5 is formed at the ridge section between the inner face 41 of the discharge flute 4 oriented to the front in the rotation direction T of the body 3 and the flank 6 at the leading end portion. The oil hole 12 is provided in the flank 6, and supplies the cutting oil to the side of the cutting edge 5. The oil hole 12 is provided with the fan-shaped cross section. The fan-shaped cross section is formed by being surrounded by the front-side inner wall surface 121, the rear-side inner wall surface 122, the outer peripheral-side inner wall surface 123, and the inner peripheral-side inner wall surface 124. The front-side inner wall surface 121 is positioned along the radial direction to the front side in the rotation direction T. The rear-side inner wall surface 122 is positioned along the radial direction to the rear side in the rotation direction T, and faces the front-side inner wall surface 121 in the circumferential direction. The outer peripheral-side inner wall surface 123 is formed by the partial cylindrical surface centered on the shaft center AX. The inner peripheral-side inner wall surface 124 is formed by the partial cylindrical surface centered on the shaft center AX and having the radius of curvature smaller than that of the outer peripheral-side inner wall surface 123, and faces the outer peripheral-side inner wall surface 123 in the radial direction. The rear-side inner wall surface 122 of the oil hole 12 curves in the circular arc shape toward the front in the rotation direction T.

Since the drill 1 is provided with the oil hole 12 having the fan-shaped cross-section, the discharge performance of the cutting oil is high compared to the round hole. Furthermore, since the rear-side inner wall surface 122 of the oil hole 12 curves in the circular arc shape toward the front in the rotation direction T, the drill 1 can secure a wide distance between the ridge section of the flank 6 and the rear-side inner wall surface 122. Note that the ridge section of the flank 6 is the ridge section between the inner face 42 of the discharge flute 4 oriented to the rear in the rotation direction T of the body 3 and the flank 6. In this way, since the drill 1 can suppress stress operating on the section between the ridge section and the oil hole 12, the drill 1 can improve the discharge performance of the cutting oil, and can also secure the tool rigidity. Since the tool rigidity is improved, the drill 1 can also be used in high-speed machining. The high-speed machining is machining in which the tool moves at high speed. The drill 1 is also effective at a relatively large size in which the cutting resistance becomes greater.

The drill 1 is further provided with the gash portion 8. The ridge line of the gash portion 8 and the flank 6 extends in the circular arc shape from the inner end of the cutting edge 5 toward the outer side in the radial direction, and is connected to the discharge flute 4. The rear-side inner wall surface 122 curves in the circular arc shape to the same direction side as the gash portion 8, at a position separated from the gash portion 8. The drill 1 is provided with the circular arc shaped gash portion 8, and as a result of the rear-side inner wall surface 122 of the oil hole 12 curving in the circular arc shape to the same direction side as the gash portion 8, a distance to the ridge section of the flank 6 can be secured to be uniformly wide.

Figure 16:
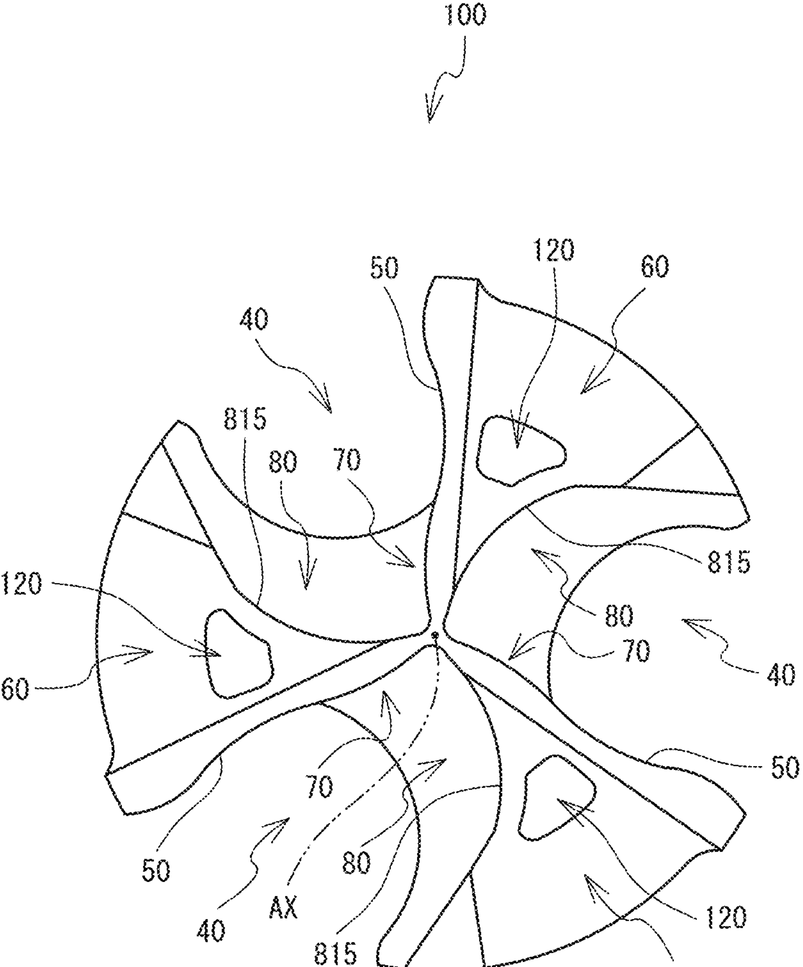
FIG. 16 is a front view of a three-edged drill 100 (a modified example)

Note that the present invention is not limited to the above-described embodiment, and various changes are possible. The drill 1 is the two-edged drill, but may be a three-edged drill or may be a drill with more edges. For example, a drill 100 shown in FIG. 16 is a three-edged drill. Although not described in detail, the drill 100 is basically provided with the shape of the drill 1 according to the above-described embodiment, and is provided with three discharge flutes 40, three cutting edges 50, three thinning edges 70, three gash portions 80, three flanks 60, three oil holes 120, and the like. The oil hole 120 has the same fan-shaped cross section as that of the above-described embodiment, and a rear-side inner wall surface thereof curves in the circular arc shape to the side of the same rotation direction T as the ridge line 811 of the gash portion 8. Thus, the drill 100 can obtain the same effects as those of the two-edged drill 1.

The oil hole 12 extends in the helical shape from the rear end portion of the shank 2 toward the leading end portion of the body 3 in this embodiment. The oil hole of the present invention, however, does not necessarily have to have the helical shape, and may have a straight line shape, for example. The three circular arc grooves 10 are provided at the leading end portion of the body 3, but the circular arc groove 10 may be omitted. The drill 1 is a long drill, but may also be a general drill. The material of the drill 1 is not limited. The DLC is coated on the surface of at least the leading end portion of the body 3, but may be coated on the outer peripheral surface 31 also. The DLC need not necessarily be coated on the body 3. The thinning edge 7 need not necessarily be formed. The gash portion 8 has the circular arc shape, but may have a straight line shape. The thinning edge 7 and the gash portion 8 may be omitted. In the fan-shaped cross-section of the oil hole 12, the front-side inner wall surface 121 has the straight line shape, but need not necessarily have the straight line shape.

The invention claimed is:

1. A drill comprising:

a bar-shaped tool main body to be rotated around a shaft center;

a discharge flute provided in a helical shape in an outer peripheral surface of the tool main body from a leading end portion toward a rear end portion thereof;

a cutting edge formed at a ridge section between an inner face, of the discharge flute, oriented toward the front in a rotation direction of the tool main body and a flank at the leading end portion;

an oil hole provided at the flank, the oil hole supplying a cutting fluid to the side of the cutting edge; and a gash portion, a ridge line between the gash portion and the flank extending from an inner end of the cutting edge toward an outer side in a radial direction while curving in a circular arc shape toward the front in the rotation direction, and connected to the discharge flute, wherein the oil hole is provided with a fan-shaped cross-section as a result of being surrounded by a front-side inner wall surface positioned to a front side in the rotation direction of the tool main body, a rear-side inner wall surface positioned to a rear side in the rotation direction of the tool main body, and facing the front-side inner wall surface in a circumferential direction, an outer peripheral-side inner wall surface formed by a partial cylindrical surface centered on a center line of the tool main body and having a radius of curvature corresponding to a radius of a circumscribed circle of the oil hole, and an inner peripheral-side inner wall surface formed by a partial cylindrical surface centered on the center line of the tool main body, having a radius of curvature corresponding to a radius of an inscribed circle of the oil hole and being smaller than the radius of curvature of the outer peripheral-side inner wall surface, and facing the outer peripheral-side inner wall surface in the radial direction, in the flank, a reference line extending from the shaft center of the tool main body toward the outer side in the radial direction is defined as a first reference line wherein an R3 corner formed between the inner peripheral-side inner wall surface and a rear-side inner wall surface is located on an intersection point between the first reference line and the inscribed circle, a reference line rotated by a first angle to the front in the rotation direction around the shaft center with respect to the first reference line is defined as a second reference line wherein the front-side inner wall surface is located on the second reference line and between the inscribed circle and the circumscribed circle, a reference line rotated by the first angle to the rear in the rotation direction around the shaft center with respect to the first reference line is defined as a third reference line wherein an R4 corner formed between the outer peripheral-side inner wall surface and the rear-side inner wall surface is located on the third reference line, and the outer peripheral-side inner wall surface is located between the second reference line and the third reference line, and a reference line rotated to the rear in the rotation direction around an intersection point between the inscribed circle and the first reference line, by a second angle greater than the first angle with respect to the first reference line and facing the gash portion is defined as a fourth reference line wherein the rear-side inner wall surface is located between the inscribed circle and the circumscribed circle, and both a rearmost end and a foremost end of the rear-side inner wall surface are located on the fourth reference line, the oil hole is provided between the second reference line and the third reference line, the front-side inner wall surface is disposed along the second reference line, and the rear-side inner wall surface is disposed on the fourth reference line, and is curved in a circular arc shape to the same direction side as the gash portion toward the front in the rotational direction, at a position separated from the gash portion.

2. The drill according to claim 1, wherein in the cross-section, a radius of curvature of the rear-side inner wall surface is equal to or greater than 0.35D and equal to or less than 0.45D.

* * * * *